Nov. 15, 1949      H. F. MAY      2,488,021
BICYCLE GENERATOR
Filed Nov. 13, 1945
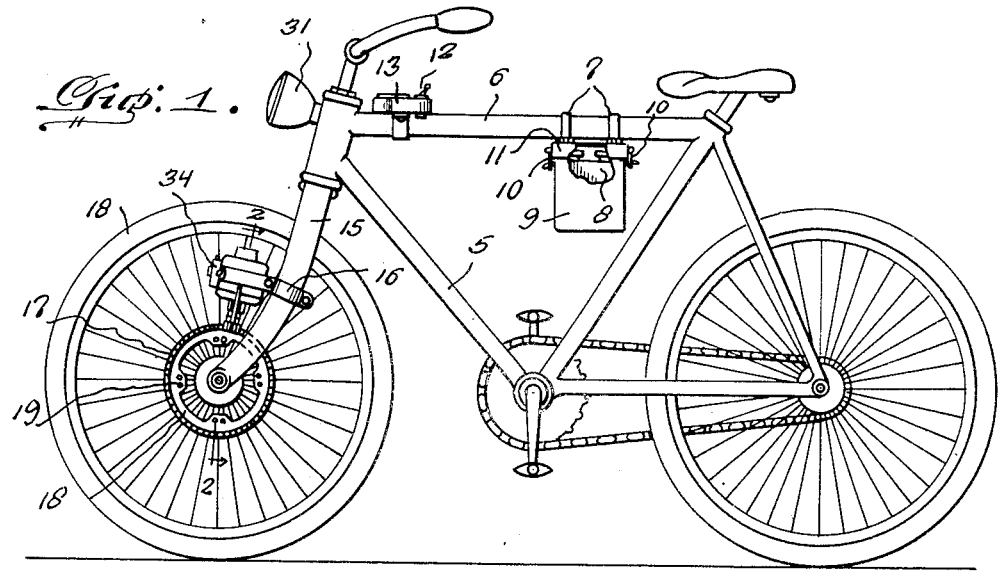
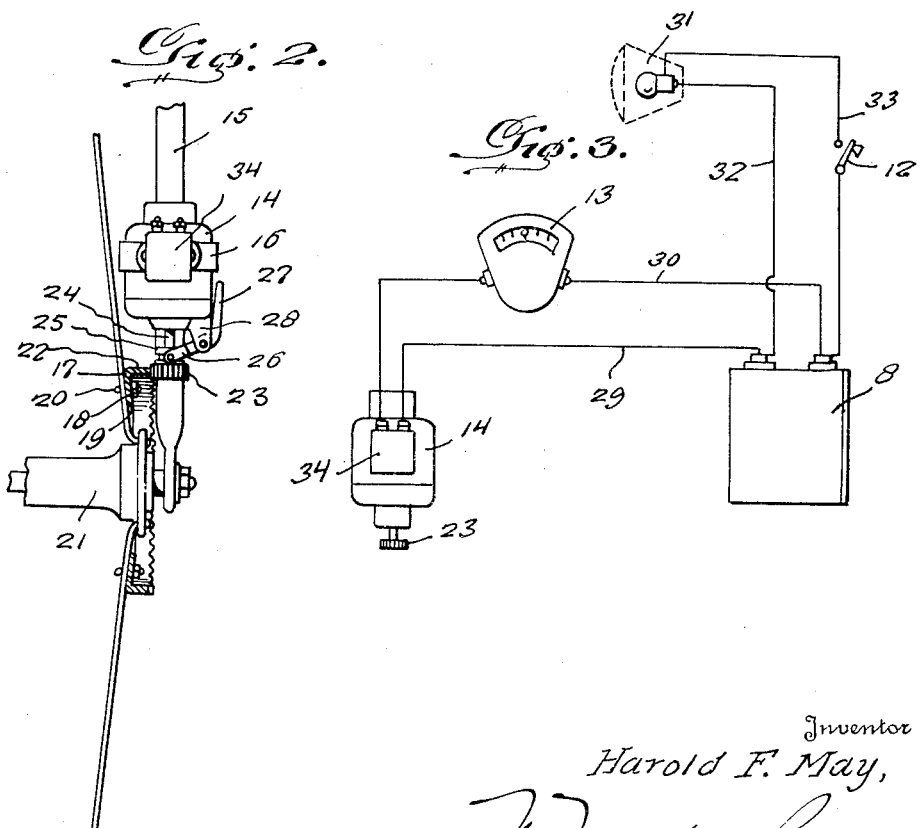
Inventor
Harold F. May, Patented Nov. 15, 1949

2,488,021

UNITED STATES PATENT OFFICE 2,488,021

BICYCLE GENERATOR

Harold F. May, Detroit, Mich.

Application November 13, 1945, Serial No. 628,150

2 Claims. (Cl. 171—209)

This invention relates to a charging generator and battery combination for vehicles and more particularly to a provision for a light or lights on a bicycle or the like. It has for its prime object to produce a simple and inexpensive construction and arrangement of parts readily applied to a bicycle, motorcycle or similar vehicle and operating with high efficiency and with minimum liability of getting out of order.

Further objects and advantages to be obtained will hereinafter more fully appear in the following description.

A practical but non-limiting embodiment of the invention is illustrated in the accompanying drawings, in which:

Figure 1 is a side elevation of a bicycle equipped according to the invention;

Figure 2 is a fragmentary section, on an enlarged scale, taken on or about the line 2—2 of Figure 1; and Figure 3 is a schematic diagram illustrative of the electrical circuit arrangements.

Referring now to the drawings in detail, the numeral 5 designates generally the frame of a conventional bicycle. Mounted in swingable suspension on the upper frame member 6 of the bicycle, as at 7, is a battery 8. The battery 8 is of a conventional rechargeable type the chemical and structural details of which are not shown in specific particulars in the drawings. For general practical purposes of the invention, however, the battery will be preferably of a multiple plate, wet type, although in some uses it may be of the dry type. As shown in Figure 1, the battery 8 is contained within a casing 9 which may be made of metal, wood, or plastic material. In the illustration, the casing 9 is detachably secured, as at 10, to a cover member 11. The attaching means 10 may be of any conventional character for the release of the casing 9, at will, but it is preferably provided with a locking means (not shown in detail) to prevent theft or unauthorized removal of the casing 9 from the cover 11 and the battery 8 from the casing 9. The means 7 for the mounting of the battery on the upper frame member 6 may be in the form of straps surrounding the frame member with a comparatively close fit to avoid undue play and prevent rattling noise but permitting an easy swinging movement of the battery in its casing whereby to maintain the casing in a vertically pendant position when the bicycle frame is tilted from side to side. Any suitable provision in connection with the supporting members 7 may be made to prevent shifting of the battery container longitudinally of the frame member 6 but permitting the aforesaid swinging movement of the container 9 thereon.

The battery 8 may be employed to supply electrical energy to a headlight, tail-lights or any other desirable electrical appliance on the vehicle (not shown) and the controlling switch for the respective circuits may be located, as at 12, on the casing of a conventional ammeter 13, which latter is placed in convenient view and reach of the rider, and preferably located on the upper frame member 6 adjacent the steering head of the frame as shown in Figure 1.

A conventional electrical generator 14 of comparatively small size but of sufficient capacity for charging the battery 8 is mounted on one of the fork members 15 of the front steering portion of the bicycle frame as at 16 (see Figures 1 and 2). The attachment 16 may be effected in any conventional manner. As shown, it is in the form of a strap-like fastener, a portion of which surrounds the generator 14 and a complemental portion is clamped around the fork 15. For driving the generator, that is, the rotor thereof, a ring-gear 17 is mounted on the front wheel of the vehicle concentric with the axis thereof. This ring-gear may be of any approved or desirable structure. In the form shown, it may be practically produced by a die forming or stamping process from sheet metal. The circular base portion 18 of the gear is formed with inwardly projected radial ears 19 which are perforated and attached to adjacent spokes of the wheels by U-bolts 20. This form and provision for the mounting of the gear affords a stable support for the same without marring or damaging the wheel structure in the region of the hub 21.

The laterally extending annular flange portion 22 of the gear 17 is formed with conventional teeth for the engagement of a pinion 23 which is suitably splined or feather keyed on the lower end portion of a driving shaft 24 projected from the rotor of the generator 14. Conventional means is provided for shifting the pinion 23 longitudinally of the driving shaft 24, such as, for example, by providing an annularly grooved hub or collar extension 25 for the working engagement of the forked head end 26 of an operating lever 27 of the bellcrank type which is pivotally mounted on a bracket extension 28 depending from the lower part of the generator casing. By this provision, when the operating lever 27 is moved into position closely adjacent the casing of the generator 14, as shown in Figure 2, the pinion 23 is placed in engagement with the ring-gear 17 so as to be thereby operated, and to move the pinion 23 out of working engagement with the ring-gear 17 the handle portion of the bellcrank lever 27 is pulled in the direction away from the generator 14, thereby lifting the opposite end portion of the lever.

From the illustration in the diagram in Figure 3, it is apparent, that, by the hook-up of the generator 14 with the battery 8 through the medium of the circuit wires 29 and 30 which respectively connect the terminals of the generator with the poles of the battery, the battery will become charged upon operation of the generator. The conventional ammeter 13 is placed in one of the circuit lines (as shown, the line 30) so as to indicate whether the battery is being charged or is discharging. In the diagram, a headlight is illustrated conventionally, as at 31, and connected by the circuit wires 32 and 33 to the poles of the battery. The switch 12 for the light circuit (illustrated structurally and mechanically as mounted on the ammeter casing 13 in Figure 1 of the drawings) is illustrated as located in the circuit wire 33 in the diagram in Figure 3. The illustrated diagram is by way of general explanation of an operative system, and it is obvious that the same may be modified according to the particular installation and number and character of electrical appliances or utilities supplied with electrical energy from the battery.

It is here noted that in a practical adaptation of the invention the generator 14 may be provided with a cut-out 34 of a manually operated or automatic type, as desired, the same to be operated accordingly when the battery is charged to a predetermined degree, so as to avoid overcharging of the battery. This cut-out 34 being of a conventional character is not illustrated or described in detail.

While the illustrated provision in the construction and arrangement of parts embodies a practical adaptation of the invention, considerable modification is contemplated within the purview of the appended claims. The invention, therefore, is not limited to the specific construction and arrangement shown.

Having thus described the invention, what is claimed is:

1. The combination with a cycle fork having a wheel rotatably mounted between the legs of the fork, of an electric current generator comprising a generator casing and a shaft extending therefrom, clamp means on said generator casing securing said casing to one of said fork legs with said shaft in substantial radial relation to the axis of said wheel, a pinion splined on said generator shaft for endwise movement relative thereto, a crown gear secured concentrically on said wheel on the side thereof adjacent to said one fork leg with the teeth of said crown gear projecting toward said pinion, and lever means pivoted on said generator casing and operatively connected to said pinion for moving said pinion into and out of engagement with the teeth of said crown gear.

2. A generator for a bicycle having a vertical fork between whose legs one of the bicycle wheels is rotatably mounted, said generator comprising a generator casing, a generator shaft projecting therefrom, clamping means secured to said casing and engaging a leg of said fork so as to mount said casing on said leg with the generator shaft depending in substantially perpendicular relation to the axis of the wheel, a pinion splined on the lower end of said shaft, a crown gear concentrically secured to said wheel on the side thereof adjacent said generator casing with the teeth thereof projecting toward said pinion, and a bell crank lever pivoted intermediate its ends on said generator casing and having one arm thereof pivoted to said pinion whereby said pinion can be raised and lowered on the generator shaft to engage and disengage from the teeth of said crown gear by swinging said bell crank between two extreme positions.

HAROLD F. MAY.

REFERENCES CITED

The following references are of record in the file of this patent:

UNITED STATES PATENTS

| Number | Name | Date |
|---|---|---|
| 568,209 | Rodriguez | Sept. 22, 1896 |
| 1,010,377 | Kempf | Nov. 28, 1911 |
| 1,068,129 | Hess | July 22, 1913 |
| 1,250,960 | Brownrigg et al. | Dec. 25, 1917 |
| 1,374,440 | Foster | Apr. 12, 1921 |
| 1,439,430 | Lyhne | Dec. 19, 1922 |
| 1,509,743 | Wegner | Sept. 23, 1924 |
| 1,581,203 | Haight, Jr. | Apr. 20, 1926 |
| 1,657,461 | Dolinar | Jan. 31, 1928 |
| 1,948,443 | Huntington | Feb. 20, 1934 |
| 2,159,885 | Cullin | May 23, 1939 |

FOREIGN PATENTS

| Number | Country | Date |
|---|---|---|
| 9,662 | Great Britain (1893) | May 17, 1893 |
| 16,919 | Great Britain (1897) | July 17, 1897 |
| 162,834 | Great Britain | May 12, 1921 |